United States Patent
Iyengar et al.

(10) Patent No.: US 10,409,981 B2
(45) Date of Patent: Sep. 10, 2019

(54) IN-PROCESS STACK MEMORY PROTECTION

(71) Applicant: International Business Machines Corporation, Armonk, NY (US)

(72) Inventors: Arun K. Iyengar, Yorktown Heights, NY (US); Ashish Kundu, Elmsford, NY (US); Gong Su, New York, NY (US); Qi Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 15/494,414

(22) Filed: Apr. 21, 2017

(65) Prior Publication Data

US 2018/0307828 A1     Oct. 25, 2018

(51) Int. Cl.
  *G06F 21/52*  (2013.01)
  *G06F 12/14*  (2006.01)

(52) U.S. Cl.
  CPC .............. *G06F 21/52* (2013.01); *G06F 12/14* (2013.01); *G06F 2221/034* (2013.01)

(58) Field of Classification Search
  CPC ......... G06F 21/50–54; G06F 21/10–14; G06F 21/62–629; G06F 21/60; G06F 21/70; G06F 21/71; G06F 21/78; G06F 21/56–568; G06F 21/577; G06F 12/14; G06F 12/1416; G06F 12/1458; G06F 12/1483; G06F 12/1425
  See application file for complete search history.

(56) References Cited

U.S. PATENT DOCUMENTS

| 7,581,089 | B1 | 8/2009 | White |
| 8,510,756 | B1* | 8/2013 | Koryakin ............ G06F 9/45558 718/1 |
| 8,561,198 | B2 | 10/2013 | Singh et al. |
| 9,430,409 | B2 | 8/2016 | Berntsen et al. |
| 2007/0174912 | A1* | 7/2007 | Kraemer ............... G06F 21/552 726/23 |

(Continued)

FOREIGN PATENT DOCUMENTS

WO     2015160759     4/2015

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Khalil Naghdali
*Assistant Examiner* — Shaqueal D Wade
(74) *Attorney, Agent, or Firm* — Law Office of Jim Boice

(57) ABSTRACT

A computer-implemented method protects stack memory from a malicious function. One or more processors identify a first function and a second function in a computer program, where the first function is an authorized function and the second function is a malicious function. The processor(s) determine that the second function is able to execute a call that provides the second function with access to a stack memory that is used by the first function. The processor(s) move data from the stack memory to a protected kernel register, which is accessible only to the first function, before the call is executed.

11 Claims, 11 Drawing Sheets

(56) References Cited

U.S. PATENT DOCUMENTS

| | | | | |
|---|---|---|---|---|
| 2012/0151179 A1* | 6/2012 | Gaertner | ............ | G06F 12/0284 |
| | | | | 711/206 |
| 2012/0255002 A1* | 10/2012 | Sallam | ................. | G06F 21/566 |
| | | | | 726/23 |
| 2015/0220453 A1* | 8/2015 | Heisswolf | .......... | G06F 12/1441 |
| | | | | 726/27 |
| 2015/0381655 A1* | 12/2015 | Zeltser | ............... | H04L 63/1491 |
| | | | | 726/23 |
| 2016/0028767 A1 | 1/2016 | Ripoll et al. | | |
| 2016/0299720 A1 | 6/2016 | Berntsen et al. | | |
| 2017/0286278 A1* | 10/2017 | Thomas | ............. | G06F 11/3688 |

OTHER PUBLICATIONS

IBM, "Collaborative Protection From Malicious Mobile Code". ip.com, Dec. 29, 2009, IPCOM000191316D.

Anonymous, "A Split Stack Implementation to Prevent Malicious Code Branches". ip.com, May 19, 2014, IPCOM000236854D.

Anonymous, "Defending Method of Stack Smashing Attack". ip.com, Feb. 29, 2016, PCOM000245305D.

Lee et al., "Enlisting Hardware Architecture to Thwart Malicious Code Injection". In: Hutter D., Müller G., Stephan W., Ullmann M. (eds) Security in Pervasive Computing. Lecture Notes in Computer Science, vol. 2802. Springer, Berlin, Heidelberg.

EECS, "Computer Security". EECS Instructional Support Group, CS 161-SP 14, Discussion 3, pp. 1-5.

Chen et al., "Shreds: Fine-Grain Execution Units With Private Memory". IEEE Symposium on Security and Privacy (SP), May 22-26, 2016.

Bisht et al., "Swipe: Eager Erasure of Sensitive Data in Large Scale Systems Software". Proceedings of the Second ACM Conference on Data and Application Security and Privacy, Feb. 7-9, 2012, pp. 295-306.

* cited by examiner

```
void main (){
    f1(){
        start_protect()
        ...
        f2(){
            stop_protect()
            ...
            f1();
            ...
            clear_stack()
        }
        ...
    }
}
```

MODIFIED RECURSIVE CALL PROCESS 505

IN-PROCESS STACK MEMORY PROTECTION

BACKGROUND

The present invention relates to the field of computers, and particularly computers that use stack memory in system memory. More particularly, the present invention relates to protecting stack memory from malicious functions.

SUMMARY

In a computer-implemented method embodiment of the present invention, one or more processors protect stack memory from a malicious function. One or more processors identify a first function and a second function in a computer program, where the first function is an authorized function and the second function is a malicious function. The processor(s) determine that the second function is able to execute a call that provides the second function with access to a stack memory that is used by the first function. The processor(s) move data from the stack memory to a protected kernel register, which is accessible only to the first function, before the call is executed. one or more processors determine that a first function in a computer program is executed before a second function in the computer program, where the first function is an authorized function and the second function is a malicious function. The processor(s) determine that the second function is able to execute a call that provides the second function with access to a stack memory that is used by the first function. The processor(s) move data from the stack memory to a protected kernel register, which is accessible only to the first function, before the call is executed.

Other embodiments of the present invention include a computer system and a computer program product.

DETAILED DESCRIPTION

Figure 1:
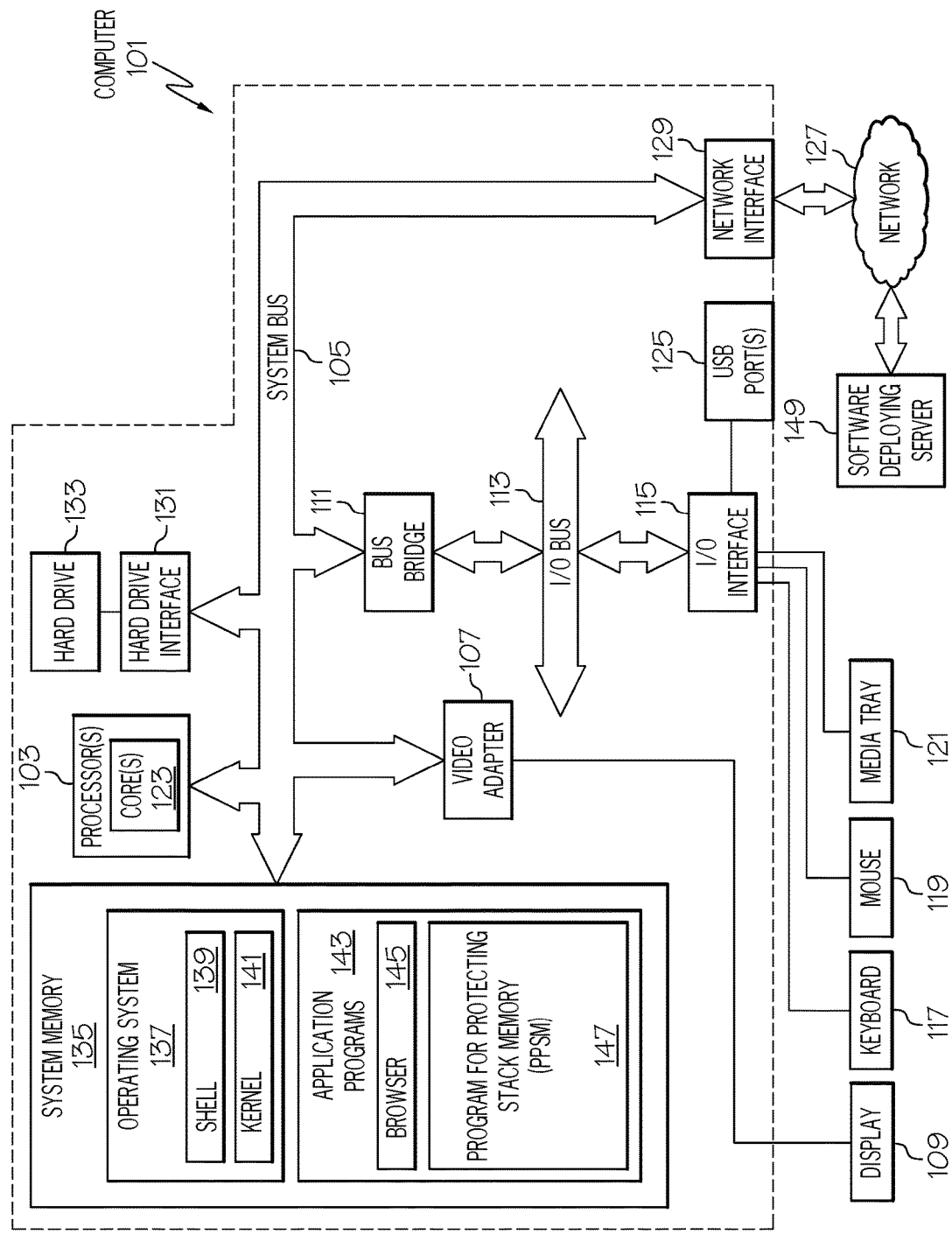
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by software deploying server 149 shown in FIG. 1.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105. In one or more embodiments of the present invention, video adapter 107 detects (e.g., using inputs from keyboard 117 and/or mouse 119) that a user has paused, stopped, rewound, or otherwise interrupted the play of a video being shown on display 109.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or remote video reviewing computers 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizing a network "cloud" environment will be discussed with reference to FIG. 7 and FIG. 8.

Referring again to FIG. 1, a hard drive interface 131 is also coupled to system bus 105. Hard drive interface 131 interfaces with a hard drive 133. In one embodiment, hard drive 133 is a non-volatile memory storage and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes operating system (OS) 137 and application programs 143 used by computer 101.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 stored in the system memory 135 system memory of computer 101 include Program for Protecting Stack Memory (PPSM) 147. In some embodiments, system memory 135 can be shared and/or application programs 143 distributed across one or more software deploying servers 149 or other systems (not depicted). In the example depicted, PPSM 147 includes program instructions (software) adapted for implementing processes and/or functions in accordance with the present invention, such as (without limitation) those described with reference to FIGS. 2-10. In some embodiments, PPSM 147 is downloaded from software deploying server 149, (on-demand or "just-in-time") e.g., where the PPSM 147 software is not downloaded until needed for execution. In some embodiments of the present invention, software deploying server 149 can perform all (or many) of the functions associated with the present invention (including execution of PPSM 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

When data is accessed by an unauthorized function, application program interface, etc., this undesirable process is known as data "leakage". The data being accessed is often due to remanence, in which data remains in memory, storage, a cloud, hardware chips, etc. after it is no longer necessary or needed by the function that is using it. For example, a first function in a software program may use stack memory to store temporary data, pointers, etc. while executing. Once the first function completes, the stack memory should be cleared, such that a second function is not able to access the stack memory data that was used by the first function.

However, simply clearing the stack memory whenever a function completes is problematic. For example, some data stored in the stack memory is persistent, meaning that it will be needed later by the first function. If such data is cleared from the stack, then it is no longer available to the first function, which results in an error when executing the first function. Furthermore, if a pointer to a certain memory location is cleared/flushed from stack memory too soon, then the first function will be unable to locate/find the next instruction from the first function.

Thus, one of the vulnerabilities that an untrusted third party application program interface (API) can exploit is a data leakage attack to the stack frame (i.e., stack memory), which is an essential component of a function during the runtime. As just mentioned, the stack memory contains local variables, function arguments, return addresses and so forth. By design, each function within a computer program has its own stack, the range of which is specified by the central processing unit (CPU) registers (e.g., a register stack pointer (RSP) and register base pointer (RBP) that show which part of stack memory is in use by or reserved for a particular function in a software program). A well-behaved (i.e., authorized) function is not expected to access the data on the stack of another function, except when chasing a pointer. However, all functions in a single program are running in the same address space, thus stack layout is quite predictable and easy to guess. Furthermore, a first function is often able to access a second function's stack if both functions are in the same process (program). Thus, illegal stack access can result in sensitive data leakage.

As such, the present invention provides a process for hiding sensitive stack data in a secure place, prior to the execution of an untrusted function or API. In one or more embodiments of the present invention, an operating system (OS) backed framework protects stacks from different functions that are in the same process.

Thus, the present invention takes advantage of protected kernel registers within a kernel to securely save the contents of stack memory. This improves the function of the computer by 1) providing additional security to the stack memory, and 2) optimizing execution of instructions since there is a reduced potential of a first function utilizing corrupted (e.g., by a second function) data.

Figure 2:
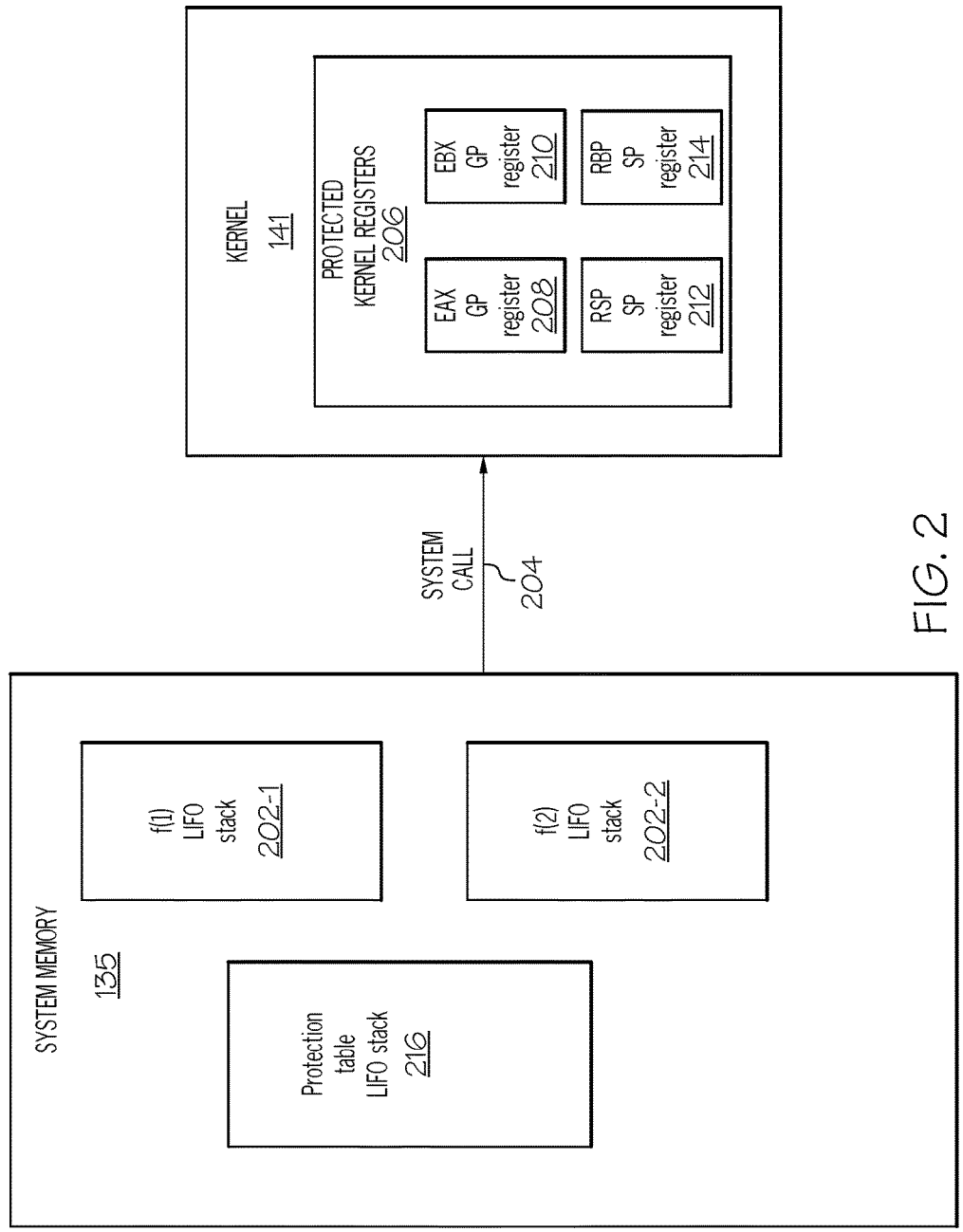
FIG. 2 depicts an architectural relationship between exposed stack memory and protected kernel registers as used in accordance with one or more embodiments of the present invention.

For example and as shown in FIG. 2, assume that the system memory 135 shown in FIG. 1 includes unsecure stack memory, such as the depicted f(1) last in first out (LIFO) stack 202-1 (used by a trusted first function "f(1)") and the f(2) LIFO stack 202-2 (used by an untrusted malicious second function "f(2)"). As indicated in FIG. 2, the f(1) LIFO stack 202-1 and the f(2) LIFO stack 202-2 are both within system memory 135, and are often contiguous (memory location wise). Thus, even though f(1) LIFO stack 202-1 is supposed to be for the exclusive use of the first function, it is not difficult for the second function to access the f(1) LIFO stack 202-1 (besides its own f(2) LIFO stack 202-2).

Therefore, rather than leaving the local variables, return addresses, saved registers, parameters, return data, pointers, and other content of the unsecured stack memory for the first function (i.e., f(1) LIFO stack 202-1) in the unsecured stack memory after the first function completes execution, the system memory 135 will make a system call 204 to protected kernel registers 206 within the kernel 141 shown in FIG. 1, in order to store the content of the f(1) LIFO stack 202-1 in one or more of the protected kernel registers 206. Such protected kernel registers 206 include, but are not limited to, an extended accumulation (EAX) general purpose (GP) register 208, which is normally used to maintain values needed for input/output port accesses, arithmetic accumulations, interrupt calls, etc. An extended base (EBX) GP register 210 is normally used as a base pointer for memory access. A register stack pointer (RSP) special purpose (SP) register 212 stores a starting position within stack memory that is used by a particular function (e.g., the first function), while a register base pointer (RBP) SP register 214 stores an ending position within the stack memory that is used by the particular function.

The protection table LIFO stack 216 stores a protection table of functions that are authorized to use the protected kernel registers 206 in accordance with the present invention, and are discussed in further detail below.

Figure 3:
FIG. 3 illustrates three exemplary computer programs in which the present invention can protect a stack memory that is used by an authorized function from a malicious function in accordance with one or more embodiments of the present invention.

With reference now to FIG. 3, consider processes 301, 303, and 305 (depicted as sequential call process 301, nested call process 303, and recursive call process 305 for reasons explained below). Assume that each of the processes 301, 303, and 305 includes a first function (shown as "f1( )") and a second function (shown as "f2( )"), and that the first function is "safe" (i.e., is a trusted/authorized function) and that the second function is "malicious" (i.e., is untrusted). In each of the processes 301, 303, and 305, the second function is called by the first function by a "call" from the first function to the second function. However, without the present invention, such calls may result in the untrusted/malicious second function being able to access the stack memory that is (or was) used by the first function.

Thus, the present invention provides a method for protecting stack memory used by a first process from a second process that is within the same program/process.

As shown in FIG. 3, in sequential call process 301 the call from the first function to the second function is a sequential call. That is, the first function completes its execution, and then calls the second function to execute next (i.e., sequentially after the first function completes its execution).

In nested call process 303, the first function calls the second function while the first function is executing.

Recursive call process 305 is similar to the nested call process 303, except that not only can the first function call the second function while the first function is still executing, but the second function can also call the first function while the second function is still executing.

As described below, one or more embodiments of the present invention for protecting stack memory from the malicious second function differ slightly in a sequential call process as compared to a nested call process or a recursive call process. However, in a preferred embodiment the present invention utilizes protected kernel registers in each scenario to securely store stack values from the stack memory for the first function.

Figure 4:
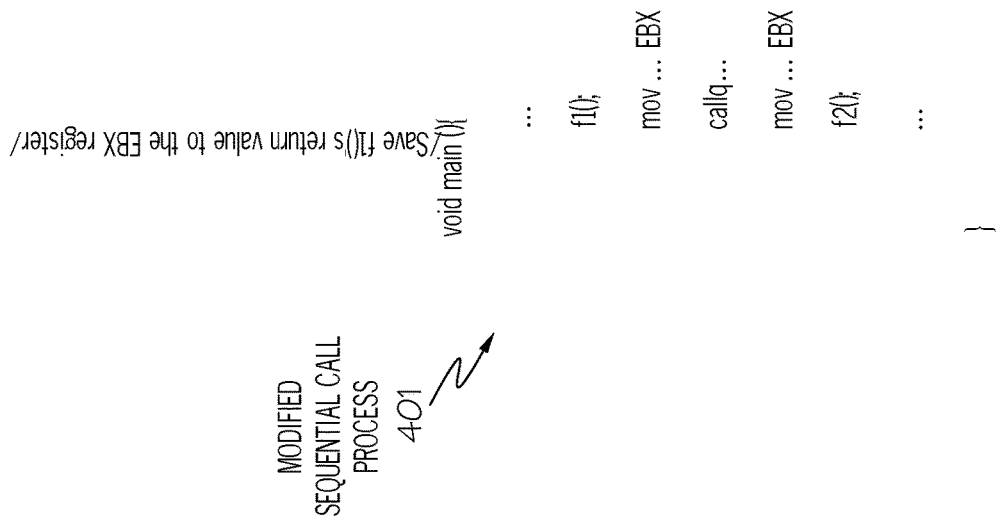
FIG. 4 depicts an exemplary sequential call process protected by a stack protection instruction in accordance with one or more embodiments of the present invention.

With reference now to FIG. 4, consider modified sequential call process 401, which has added additional instructions to the sequential call process 301 in order to protect the stack memory used by the first function (depicted as "f1( )"). As shown in FIG. 4, after the first function completes execution, the return value (i.e., the value that is generated by executing the first function) is initially stored in an extended base (EBX) register (e.g., EBX GP register 210 shown in FIG. 2) that is within the kernel (e.g., kernel 141) of the operating system that supports the modified sequential call process 401. Thereafter, the memory stack that is used by the first function is cleared (using the instruction "callq", which is a "clear stack" instruction), and the return value is moved from the EBX register to the extended accumulator (EAX) register (e.g., EAX GP register 208 shown in FIG. 2) within the kernel. Note that if the stack memory were simply cleared in the sequential call process 301 shown in FIG. 3 (without saving the return value to the EBX/EAX registers), then when the first function finishes execution, the return value would not be correct (since it has been cleared out of the stack memory for the first function).

Figure 5:
FIG. 5 illustrates an exemplary placement of stack memory protection instructions in a software program in accordance with one or more embodiments of the present invention.

With reference now to FIG. 5, consider the modified recursive call process 505, which is a modified version of the recursive call process 305 shown in FIG. 3. As shown in FIG. 5, the modified recursive call process 505 now includes a start_protect( ) instruction (also called a "protect_stack( )" instruction) after the first function ("f1( )") completes execution the first time. The second function then executes without being able to access the stack memory that is being used by the first function. After the second function completes its execution, a stop_protect( ) instruction (also called an "unprotect_stack( )" instruction) makes the stack memory for the first function once again available for use by the first function when it executes a second time. After the first function completes its execution the second time, the stack memory is cleared (assuming that the return value from the first and second executions of the first function are either no longer needed or are safely stored in a protected kernel register).

In order to know which functions are allowed to use the start_protect( ) and stop_protect( ) functions depicted in FIG. 5, or to even use protected kernel registers at all (in order to save and protect contents of the stack memory), the protection table LIFO stack 216 is accessed.

Figure 6:
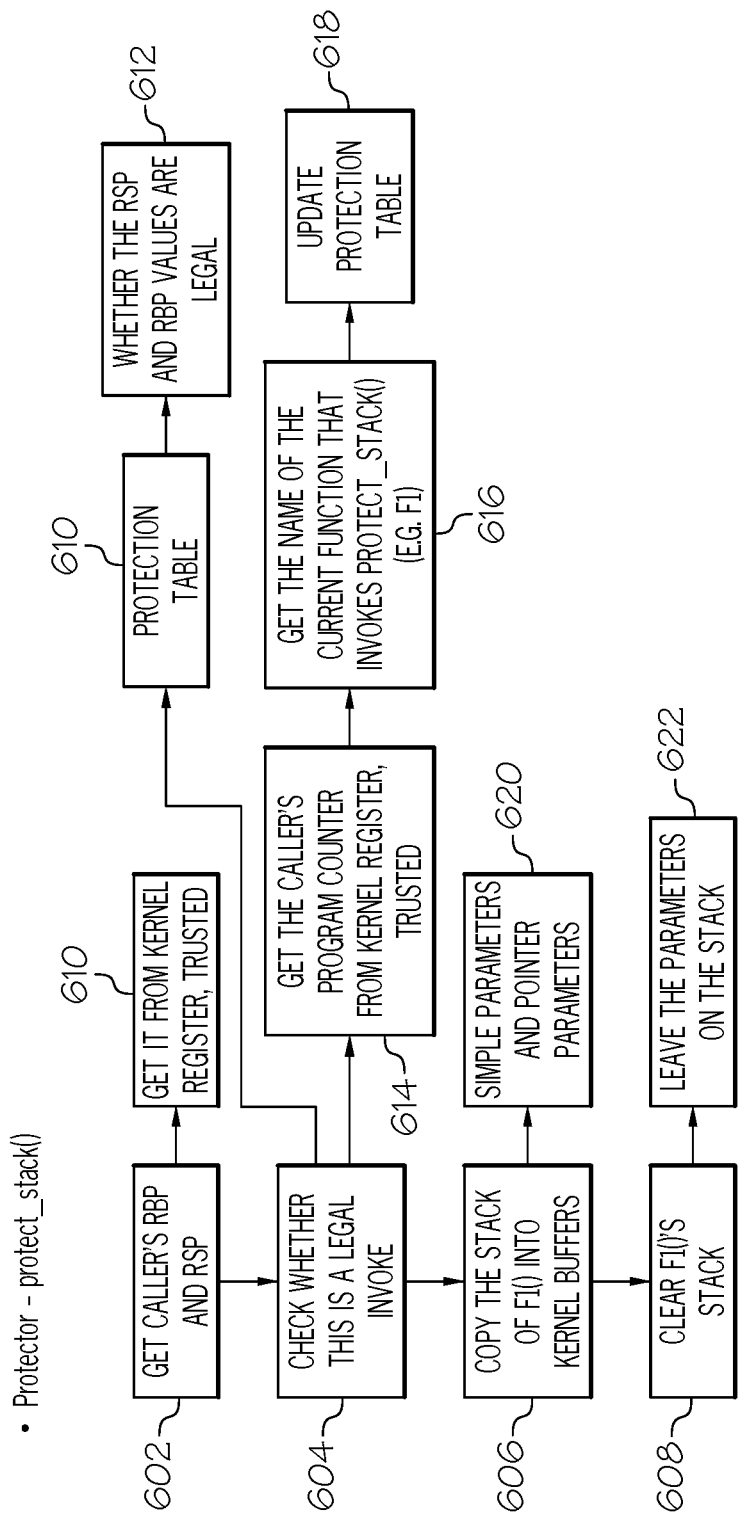
FIG. 6 depicts an exemplary stack protection initiation process in accordance with one or more embodiments of the present invention.

With reference now to FIG. 6, an overview of an exemplary embodiment of the start_protect( ) instruction (referred to in FIG. 6 as a "protect_stack( )" instruction) is presented. As shown in block 602, the system first gets the register base pointer (RBP) and register stack pointer (RSP) for the function that is invoking the protect_stack( ) instruction. The RBP and RSP information tells the system the range of addresses in the stack memory that is used by the function that is to be protected by the protect_stack( ) instruction. That is, the RBP and RSP identify a range of system memory used by stack memory that is used by a first function (e.g., f(1) LIFO stack 202-1 shown in FIG. 2). As indicated in block 610, these values may be obtained from trusted kernel registers, such as RBP SP register 214 and RSP SP register 212 shown in FIG. 2.

As shown in block 604 in FIG. 6, the system then checks to see whether or not this function is allowed to invoke the protect_stack( ) operation. That is, only trusted functions are allowed to invoke the protect_stack( ) operation. As such, the protection table LIFO stack 216 has a current listing of functions that are allowed to invoke the protect_stack( ) operation. This table is on a LIFO stack since the function that is currently allowed to use the protect_stack( ) operation may change, as in the case of a recursive call process in which each interior function may or may not be allowed to use the protect_stack( ) operation. As shown in block 610, the protection table is accessed. If a particular section of stack memory is allocated to a trusted function (block 612), as indicated by the RBP and RSP values shown in the protection table, then the program counter of the caller (trusted function) is obtained from the trusted kernel registers (e.g., RSP SP register 212 and RBP SP register 214 shown in FIG. 2), as shown in block 614. This lets the system get the name of the current function (e.g., the first function f1( )) that is to invoke the protect_stack( ) operation, as shown in block 616. This information is then updated in the protection table, as indicated by block 618.

As shown in block 606, a copy of the stack information for the first function is then copied into the kernel buffers (e.g., protected kernel registers 206), including both simple parameters (e.g., variables representing data itself) and pointer parameters (e.g., variables used to represent pointers to data), as indicated by block 620.

As shown in block 608, the system then clears the stack used by the first function. However, in one or more embodiments and as indicated in block 622, certain parameters for the first function are left on the stack. For example, certain variable names that are defined by the first function and/or data values that are generated by the first function may need to be used by the second function. Since the contents of the stack have already been copied into the secure kernel buffers, such parameters can be left on the stack, since (as shown in FIG. 7) the stack for the first function will be reconstructed after the second parameter completes its execution.

Figure 7:
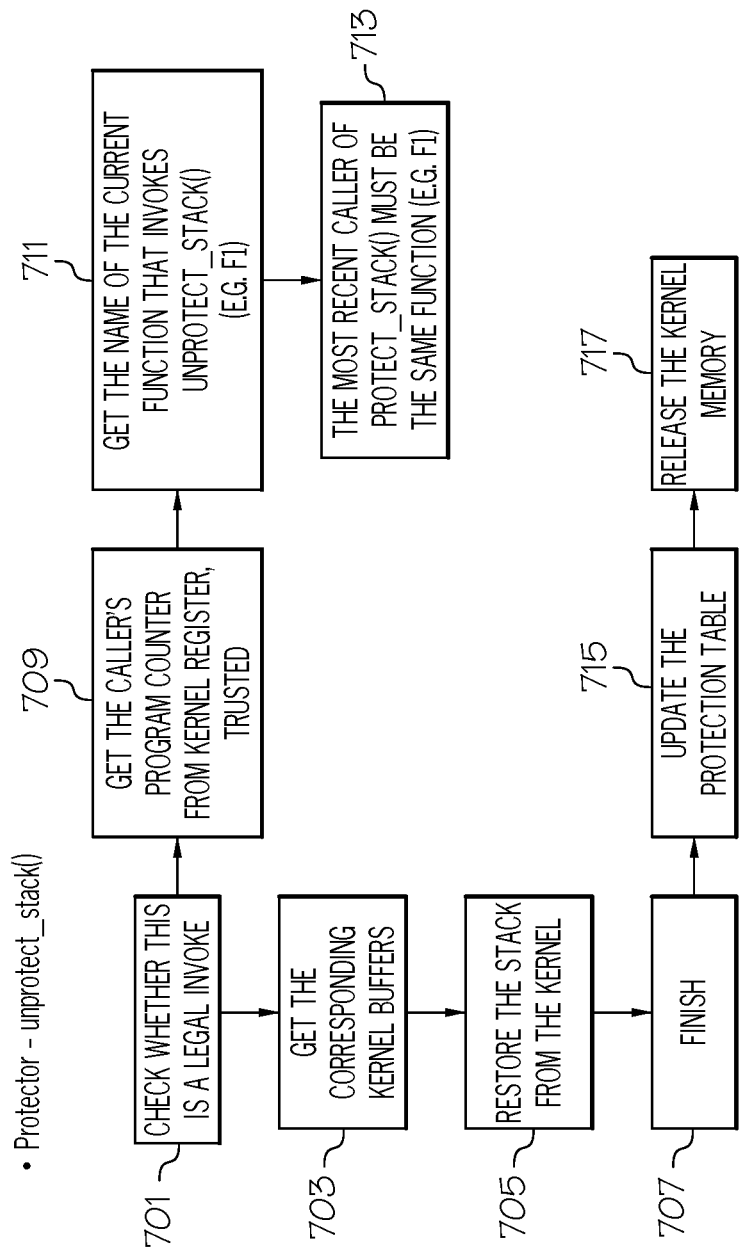
FIG. 7 illustrates an exemplary stack protection conclusion process in accordance with one or more embodiments of the present invention.

With reference then to FIG. 7, the system first confirms that the function that is to invoke the unprotect_stack( ) operation is the same function that invoked the protect_stack( ) operation as shown in FIG. 6. That is, one function cannot have its stack memory protected followed by another function unprotecting that same stack memory. As such, as shown in block 709 the system will get the program counter from the kernel register (e.g., one or more of the protected kernel registers 206 shown in FIG. 2), in order for the system to get the name of the current function that originally invoked the protect_stack( ) operation, and thus is authorized to invoke the unprotect_stack( ) operation, as shown in block 711. That is, whichever function was the most recent function to invoke the protect_stack( ) operation must be the same function that invokes the unprotect_stack operation, as shown in block 713.

As shown in block 703 in FIG. 3, the system then gets the corresponding kernel buffers that were used when invoking the protect_stack( ) operation, in order to restore the stack memory for the first function f1 to the state that it was in before the protect_stack( ) operation was invoked, as depicted in block 705.

As shown in block 707, the process then finishes by updating the protection table (block 715) found in the protection table LIFO stack 216 shown in FIG. 2, and the kernel memory/register used to temporarily store the contents of the first functions' stack is released for use by other functions (see block 717).

Figure 8:
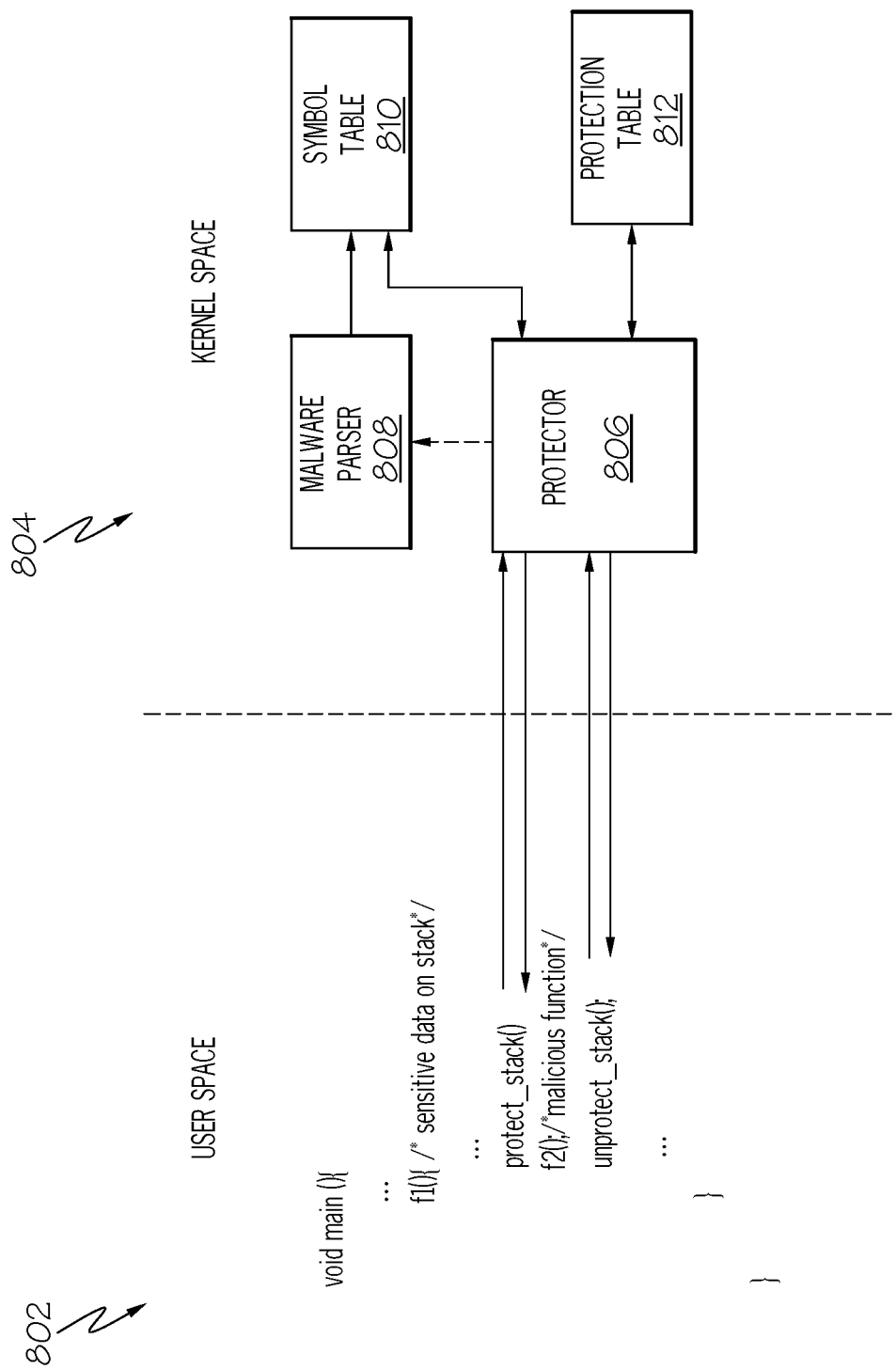
FIG. 8 illustrates a call to kernel space from user space to protect stack memory in accordance with one or more embodiments of the present invention.

As indicated herein, the present invention restricts which functions are able to protect stack memory by restricting access to kernel space. That is, as shown in FIG. 8, there is a user space 802 (i.e., an unrestricted area in system memory where the program is edited, accessed, etc.) and a kernel space 804 (i.e., a restricted area in the kernel). When the user space 802 makes a system call to the kernel space to invoke the protect_stack( ) operation, a protector 806 (i.e., part of the PPSM 147 shown in FIG. 1) calls a malware parser 808, in order to determine whether the second function f2( ) is malicious. This can be achieved by simply looking up the suspected malicious function f2( ) in a symbol table 810 (i.e., a static table of function names) and a protection table 812 (i.e., a table of functions that are allowed to invoke the protect/unprotect operations on the stack). The protector 806 then protects the stack memory as described herein.

Figure 9:
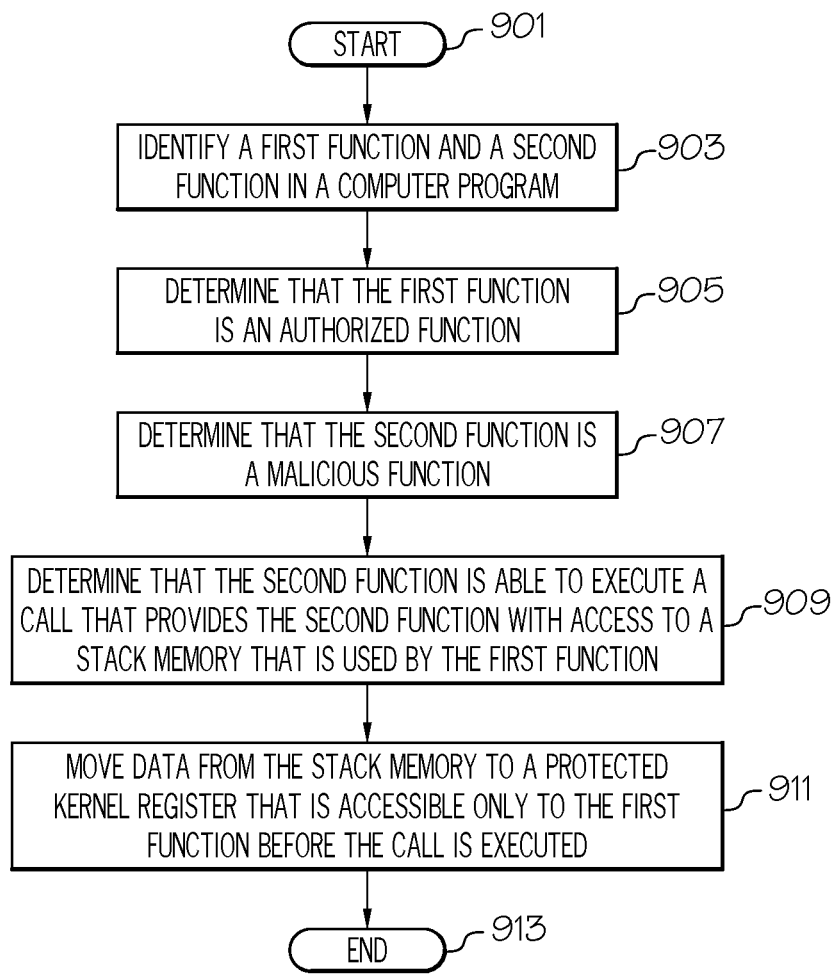
FIG. 9 depicts an exemplary method in accordance with one or more embodiments of the present invention.

With reference now to FIG. 9, a high level flow chart of one or more steps performed by one or more processors to protect stack memory is presented.

After initiator block 901, one or more processors identify a first function (e.g., f1( ) shown in the figures) and a second function (e.g., f2( ) shown in the figures) in a computer program, as described in block 903.

As described in block 905, one or more processors then determine that the first function is an authorized function (i.e., is authorized to have the protect_stack( ) function described invoked on its behalf).

As described in block 907, one or more processors also determine that the second function is a malicious function (e.g., by checking the protection table 812 shown in FIG. 8).

As described in block 909, one or more processors determine that the second function is able to execute a call that provides the second function with access to a stack memory that is used by the first function. That is, the second function may (in an unwanted manner) be able to access the stack memory that the first function is using, and thus poses a threat to the operation of the computer program, or at least the execution of the first function.

As described in block 911, one or more processors then move data from the stack memory (e.g., f(1) LIFO stack 202-1 shown in FIG. 2) to a protected kernel register (e.g., one or more of the protected kernel registers 206 shown in FIG. 2) before the call is executed. As described herein, the protected kernel register is accessible only to the first function, and thus cannot be altered by the second function.

The flow-chart ends at terminator block 913.

In an embodiment of the present invention depicted in FIG. 3 and FIG. 4, the call from the second function is a sequential call, meaning that the second function is trying to access the stack memory of the first function after the first function has completed its execution. As such and as described herein, in this embodiment one or more processors store results of execution of the first function in an EBX register, wherein the EBX register is a base general purpose register that is provided by a kernel of an operating system used by the computer program, and wherein the EBX register is accessible only to the first function. Thereafter and in response to storing the results of the execution of the first function in the EBX register, the one or more processors clear the stack memory that is used by the first function. In response to clearing the stack memory, one or more processors may then move the results of execution of the first function from the EBX register to an EAX register, where the EAX register is an accumulation general purpose register that is provided by the kernel, and where the EAX register is accessible only to the first function. Thus, an additional layer of protection is provided to the return value and other parameters created by and/or used by the first function.

In an embodiment of the present invention, the call is a nested call (e.g., as used in the nested call process 303 shown in FIG. 3). One or more processors store results of execution of the first function in the stack memory, and then store parameters used by the first function in the stack memory. One or more processors then move the results of execution of the first function from the stack memory to the protected kernel register while leaving the parameters used by the first function in the stack memory, such that they are still available to the second function. One or more processors then determine whether execution of the second function is complete. In response to determining that execution of the second function is complete, one or more processors then move the results of execution of the first function from the protected kernel register to the stack memory.

In an embodiment of the present invention, the call is a recursive call in which the first function calls the second function and the second function subsequently calls the first function. One or more processors thus execute a first execution of the first function. In response to determining that the first function has completed the first execution, one or more processors move results of the first execution of the first function from the stack memory to the protected kernel register, such that results of the first execution are flushed from the stack memory. In response to results of the first execution being flushed from the stack memory, one or more processors then execute the second function. Upon determining that execution of the second function has completed, one or more processors then restore the results of the first execution of the first function from the protected kernel register back to the stack memory and then execute a second execution of the first function.

In an embodiment of the present invention, one or more processors access a protection table that is stored in a last in first out (LIFO) stack that identifies the first function as being an authorized function for said moving data from the stack memory to the protected kernel register. (See protection table LIFO stack 216 shown in FIG. 2.)

In an embodiment of the present invention, one or more processors identify a register stack pointer (RSP) value and a register base pointer (RBP) value for the first function, where the RSP value and the RBP value identify stack boundaries used by the first function from the stack memory. One or more processors restore data to the stack memory from the protected kernel register only within the stack boundaries used by the first function from the stack memory.

Thus, as described herein, the present invention provides a system and method to protect stack frames of trusted functions. These stack frames of the trusted functions/hold/store process sensitive data used by the trusted functions, as well as information such as the addresses of the trusted functions, called resources, etc., and thus need to be protected from malicious functions, which may be part of a same program P.

As described herein, one or more embodiments of the present invention takes the program P and a set of "trusted functions" and a set of "untrusted functions" that are part of the program P. The invention analyzes P to determine where to insert "protect_stack( )" (also referred to herein as "start_protect( )") instructions and "unprotect_stack( )" (also referred to herein as "stop_protect( )" instructions, which use the kernel to protect the stack.

As described herein, the present invention is able to handle multiple trusted functions and multiple untrusted functions calling each other in sequence, as well as in nested and recursive manners.

The present invention utilizes a kernel component, which maintains the security of the stack frames (i.e., "stack memory", "stack", etc. used by one or more trusted functions in program P) of the trusted functions whenever the trusted function completes and/or immediately before another function (including an untrusted function) is called.

According to one or more embodiments, the present invention defines an identity of a function (e.g., function "f1( )"), which is then used in a lookup table to dynamically determine an address of the function (i.e., the starting address and end address of the function in a read only memory area). This identity is also used to identify the parameter types (signature) of the function, which can be found on a static lookup table. Thus, this identity of the function is used to identify the function (e.g., function "f1( )") that is asking to protect/unprotect the stack frame used by function f1( ). If a function (e.g., function "f2( )") other than f1( ) asks to protect the stack frame of f1( ), then the system uses the identities of f1( ) and f2( ) to determine that f2( ) does not have authority to access the stack for f1( ), and declines the request from f2( ) to protect/unprotect the stack frame used by f1( ).

The identity of the trusted function (e.g., "f1( )") is unable to be forged, since the identities of all functions in program P are found in a static (immutable) table. Therefore, malicious functions cannot masquerade themselves as other functions for our system, since the identity of a malicious function f2( ) will be fixed as "f2( )". Thus, the present invention provides a form of "access control" and "privileges" between functions based on their trust-worthiness (as based on their fixed identities).

In one or more embodiments of the present invention, the present invention leaves the values of parameters in the stack frame of trusted function f1( ) for use by untrusted function f2( ). Such parameters/values are needed for the next function f2( ) that is called by f1( ) in nested fashion in order to ensure that f2( ) continues without leading to any crash or erroneous computing due to unavailability of parameters.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
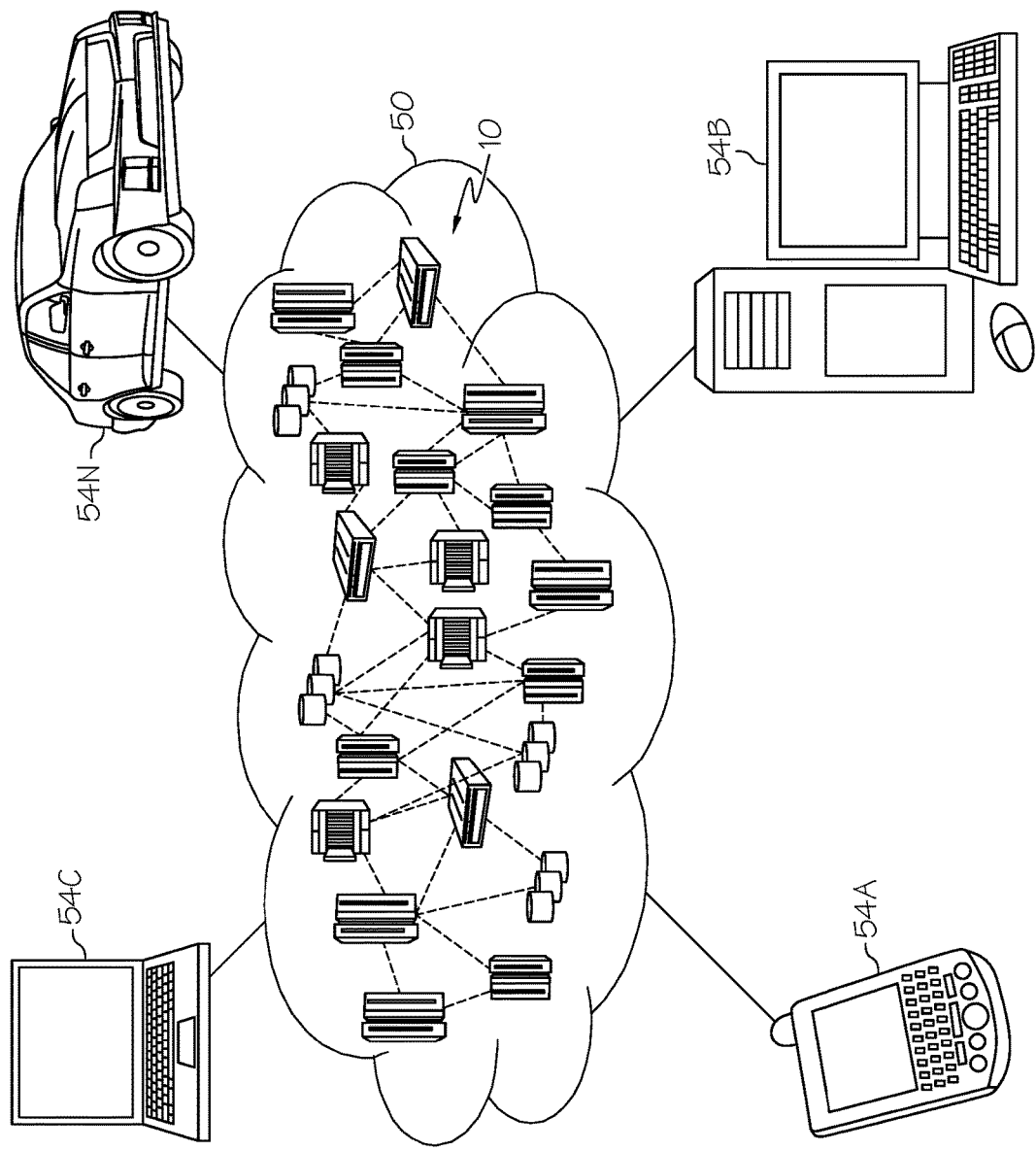
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
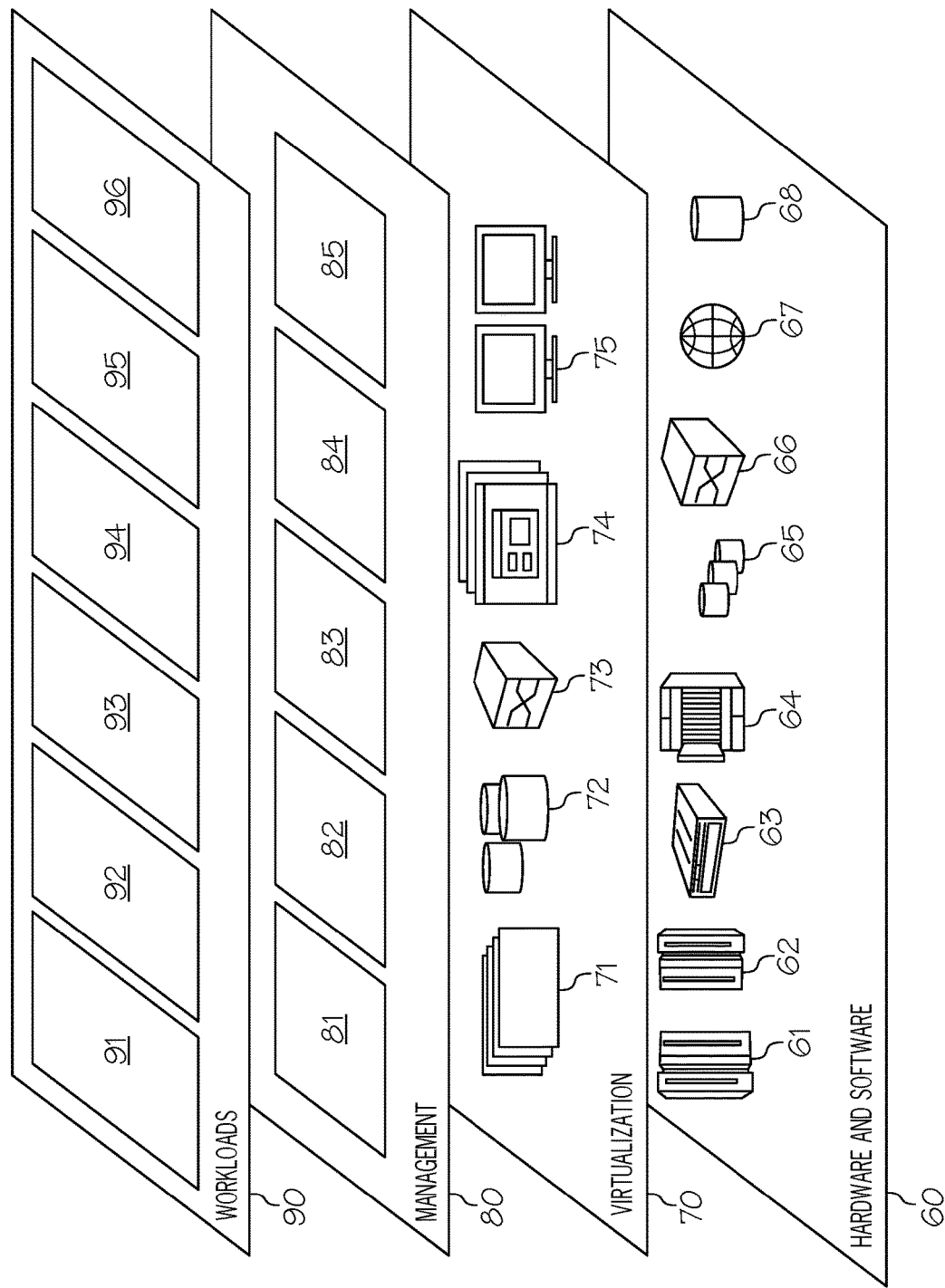
FIG. 11 depicts abstraction model layers of a cloud computing environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and stack protection processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
identifying, by one or more processors, a first function and a second function in a computer program;
determining, by the one or more processors, that the first function is an authorized function;
determining, by the one or more processors, that the second function is a malicious function;
determining, by the one or more processors, that the second function is able to execute a call that provides the second function with access to a stack memory that is used by the first function, wherein the call is a sequential call;
moving, by the one or more processors, data from the stack memory to a protected kernel register before the call is executed, wherein the protected kernel register is accessible only to the first function;
storing, by the one or more processors, results of execution of the first function in an extended base (EBX) register, wherein the EBX register is a base general purpose register that is provided by a kernel of an operating system used by the computer program, and wherein the EBX register is accessible only to the first function;
in response to storing the results of the execution of the first function in the EBX register, clearing, by the one or more processors, the stack memory that is used by the first function; and
in response to clearing the stack memory, moving, by the one or more processors, the results of execution of the first function from the EBX register to an extended accumulation (EAX) register, wherein the EAX register is an accumulation general purpose register that is provided by the kernel, and wherein the EAX register is accessible only to the first function.

2. The computer-implemented method of claim 1, further comprising:
accessing, by the one or more processors, a protection table, wherein the protection table is stored in a last in first out (LIFO) stack that identifies the first function as being an authorized function for said moving data from the stack memory to the protected kernel register.

3. The computer-implemented method of claim 1, further comprising:
identifying, by the one or more processors, a register stack pointer (RSP) value and a register base pointer (RBP) value for the first function, wherein the RSP value and the RBP value identify stack boundaries used by the first function from the stack memory; and
restoring, by the one or more processors, data to the stack memory from the protected kernel register only within the stack boundaries used by the first function from the stack memory.

4. A computer program product for protecting stack memory from malicious functions, the computer program product comprising a computer readable storage device having program instructions embodied therewith, the program instructions readable and executable by a computer to cause the computer to:
identify a first function and a second function in a computer program;
determine that the first function is an authorized function;
determine that the second function is a malicious function;
determine that the second function is able to execute a call that provides the second function with access to a stack memory that is used by the first function, wherein the call is a nested call;
move data from the stack memory to a protected kernel register before the call is executed, wherein the protected kernel register is accessible only to the first function;
store results of execution of the first function in the stack memory;
store parameters used by the first function in the stack memory;
move the results of execution of the first function from the stack memory to the protected kernel register while leaving the parameters used by the first function in the stack memory;
determine whether execution of the second function is complete; and
in response to determining that execution of the second function is complete, move the results of execution of the first function from the protected kernel register to the stack memory.

5. The computer program product of claim 4, wherein the program instructions are further readable and executable by the computer to cause the computer to:
access a protection table, wherein the protection table is stored in a last in first out (LIFO) stack that identifies the first function as being an authorized function for said moving data from the stack memory to the protected kernel register.

6. The computer program product of claim 4, wherein the program instructions are further readable and executable by the computer to cause the computer to:
identify a register stack pointer (RSP) value and a register base pointer (RBP) value for the first function, wherein the RSP value and the RBP value identify stack boundaries used by the first function from the stack memory; and restore data to the stack memory from the protected kernel register only within the stack boundaries used by the first function from the stack memory.

7. The computer program product of claim 4, wherein the program instructions are executed as a service in a cloud environment.

8. A computer system comprising:
one or more processors;
one or more computer readable memories, operably coupled to the one or more processors, wherein the one or more computer readable memories store program instructions for execution by at least one of the one or more processors, the stored program instructions comprising:
program instructions to identify a first function and a second function in a computer program;
program instructions to determine that the first function is an authorized function;
program instructions to determine that the second function is a malicious function;
program instructions to determine that the second function is able to execute a call that provides the second function with access to a stack memory that is used by the first function wherein the call is a recursive call in which the first function calls the second function and the second function subsequently calls the first function; and
program instructions to move data from the stack memory to a protected kernel register before the call is executed, wherein the protected kernel register is accessible only to the first function;
program instructions to execute a first execution of the first function;
program instructions to, in response to determining that the first function has completed the first execution, move results of the first execution of the first function from the stack memory to the protected kernel register, wherein results of the first execution are flushed from the stack memory;
program instructions to, in response to results of the first execution being flushed from the stack memory, execute the second function;
program instructions to determine that execution of the second function has completed;
program instructions to, in response to determining that execution of the second function has completed, restore the results of the first execution of the first function from the protected kernel register back to the stack memory and execute a second execution of the first function.

9. The computer system of claim 8, further comprising:
program instructions to access a protection table, wherein the protection table is stored in a last in first out (LIFO) stack that identifies the first function as being an authorized function for said moving data from the stack memory to the protected kernel register.

10. The computer system of claim 8, further comprising:
program instructions to identify a register stack pointer (RSP) value and a register base pointer (RBP) value for the first function, wherein the RSP value and the RBP value identify stack boundaries used by the first function from the stack memory; and
program instructions to restore data to the stack memory from the protected kernel register only within the stack boundaries used by the first function from the stack memory.

11. The computer system of claim 8, wherein the program instructions are executed as a service in a cloud environment.

* * * * *